(12) United States Patent
Lynn et al.

(10) Patent No.: US 12,187,388 B2
(45) Date of Patent: Jan. 7, 2025

(54) FREE FLOW ARTIFICIAL UPWELLING SYSTEM AND METHOD

(71) Applicant: Other Lab, LLC, San Francisco, CA (US)

(72) Inventors: Peter Sturt Lynn, Alameda, CA (US); Jonathan B. Pompa, Long Beach, CA (US)

(73) Assignee: Other Lab, LLC, San Francisco, CA (US)

( * ) Notice: Subject to any disclaimer, the term of this patent is extended or adjusted under 35 U.S.C. 154(b) by 455 days.

(21) Appl. No.: 17/741,250

(22) Filed: May 10, 2022

(65) Prior Publication Data

US 2022/0355905 A1    Nov. 10, 2022

Related U.S. Application Data

(60) Provisional application No. 63/186,630, filed on May 10, 2021.

(51) Int. Cl.
| | |
|---|---|
| *B63B 22/04* | (2006.01) |
| *A01G 33/00* | (2006.01) |
| *A01K 61/65* | (2017.01) |
| *B63B 1/24* | (2020.01) |
| *B63B 79/10* | (2020.01) |
| *B63H 11/04* | (2006.01) |

(52) U.S. Cl.
CPC .............. *B63B 22/04* (2013.01); *A01G 33/00* (2013.01); *A01K 61/65* (2017.01); *B63B 1/246* (2013.01); *B63B 79/10* (2020.01); *B63H 11/04* (2013.01)

(58) Field of Classification Search
CPC .......... B63B 1/00; B63B 1/246; B63B 22/00; B63B 22/04; B63B 79/00; B63B 79/10; B63H 11/04; A01G 33/00; A01K 61/54; A01K 61/59; A01K 61/65; Y02A 40/81; E02B 3/046
USPC ............... 441/1, 6, 21, 22, 23; 119/234, 235
See application file for complete search history.

(56) References Cited

U.S. PATENT DOCUMENTS

| | | | |
|---|---|---|---|
| 6,024,050 A * | 2/2000 | Rheault ................. | A01K 61/54 119/239 |
| 2003/0094141 A1* | 5/2003 | Davis ..................... | A01K 61/59 119/234 |
| 2017/0055502 A1* | 3/2017 | Gagliano ................ | E02B 3/046 |

(Continued)

FOREIGN PATENT DOCUMENTS

| | | |
|---|---|---|
| CN | 210124224 U | 3/2020 |
| KR | 101413449 B1 | 7/2014 |
| KR | 101469426 B1 | 12/2014 |

(Continued)

OTHER PUBLICATIONS

International Search Report and Written Opinion mailed Sep. 21, 2022, Patent Application No. PCT/US2022/028639, 9 pages.

*Primary Examiner* — Daniel V Venne
(74) *Attorney, Agent, or Firm* — Davis Wright Tremaine LLP

(57) ABSTRACT

An upweller array configured to be disposed in a body of water and that has one or more upweller systems. The one or more upweller systems include a buoy configured to float on the surface of the body of water, a tether coupled to the buoy and a hydrofoil rotor coupled to the tether. The hydrofoil rotor is configured to be disposed in the body of water based on a length of the tether.

20 Claims, 11 Drawing Sheets

(56) References Cited

U.S. PATENT DOCUMENTS

2021/0229782 A1    7/2021  Lynn et al.

FOREIGN PATENT DOCUMENTS

| KR | 10-2017-0101628 A | 9/2017 |
| WO | 2013003184 A2 | 1/2013 |

* cited by examiner

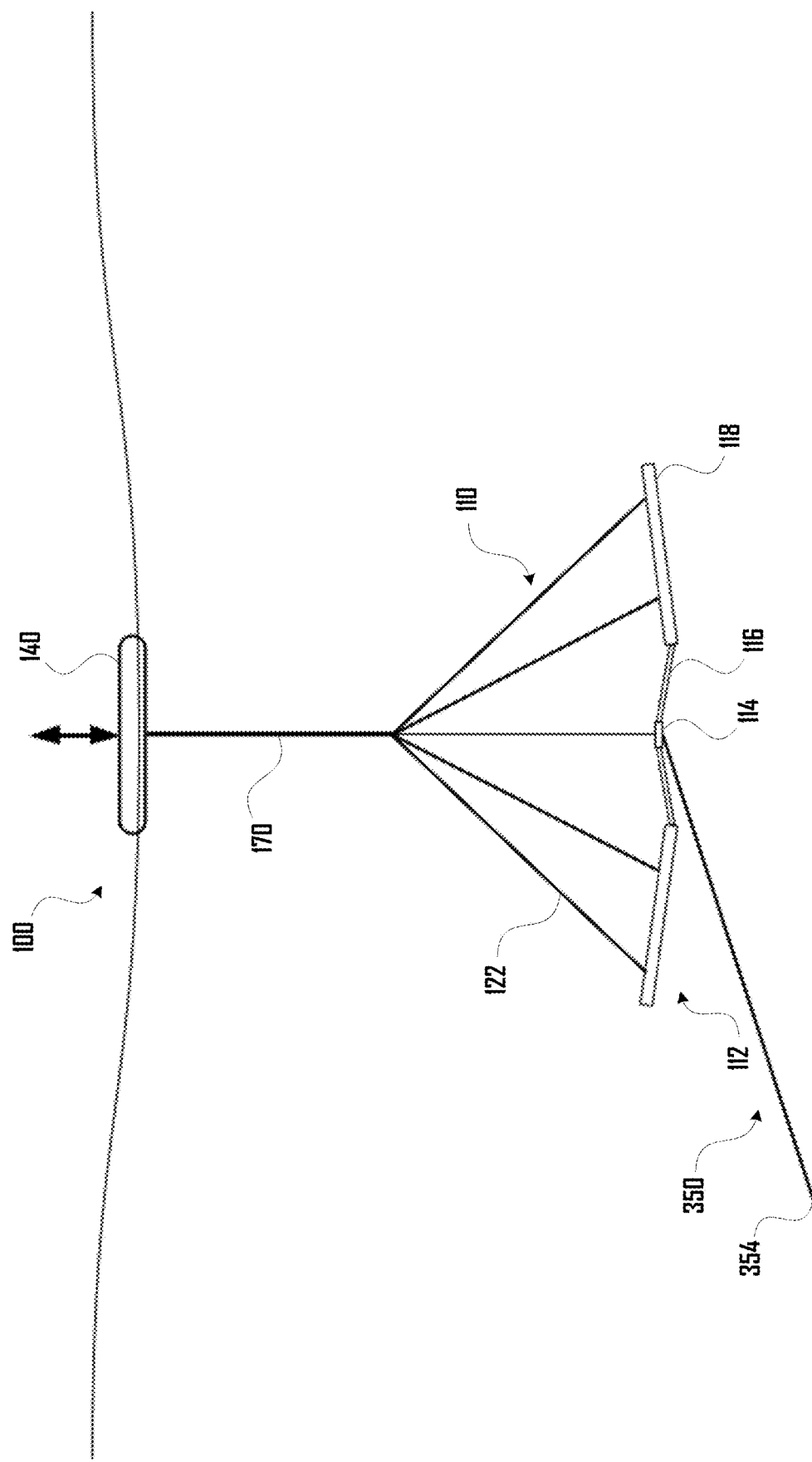

FREE FLOW ARTIFICIAL UPWELLING SYSTEM AND METHOD

CROSS-REFERENCE TO RELATED APPLICATIONS

This application is a non-provisional of and claims the benefit of U.S. Provisional Application No. 63/186,630, filed Month May 10, 2021, entitled "FREE FLOW ARTIFICIAL UPWELLING DEVICE,". This application is hereby incorporated herein by reference in its entirety and for all purposes.

STATEMENT REGARDING FEDERALLY SPONSORED RESEARCH

This invention was made with Government support under contract number DE-AR0000923 awarded by DOE, Advanced Research Projects Agency-Energy. The Government has certain rights in this invention.

BACKGROUND

Upwellings bring cool nutrient rich water to the surface of the ocean that greatly increases biological productivity, with approximately 25% of global fish production occurring from natural upwellings that make up just 5% of the total ocean area. Other estimates indicate that coastal upwelling regions account for only one percent of the ocean surface, yet they contribute to roughly 50 percent of the world's fisheries landings. In contrast, the vast majority of the ocean is effectively desert, with low nutrient concentrations in surface waters, yet nutrients increase dramatically once below the photosynthetic and wave mixing zone. The deep ocean is a truly huge reservoir of nitrates. In practice, phytoplankton absorbs surface nutrients before dying and sinking these nutrients, thereby depriving the surface water of these nutrients. This is especially true during summer months when sunlight for photosynthesis is most available. Biological productivity in the deep ocean is on average almost a tenth that of land as a consequence. And yet the biological productivity of seaweeds and phytoplankton can significantly exceed that of the highest yield terrestrial plants under ideal circumstances.

Within the ocean there is a density gradient, known as the pycnocline, that is dominated by salinity and temperature gradients. This results in a stratification of the ocean and presents a gravitational potential energy against which an upwelling must be powered. If there is no density gradient or stratification, then mixing can occur more freely and it requires little energy to bring nutrient rich deeper water to the surface. Hence surface nutrients tend to increase over the winter months and closer to the poles, with surface waters becoming denser due to lower temperature.

Artificial upwellings have the capacity to intensively cool and fertilize surface waters, greatly increasing biological productivity in a manner not dissimilar to fertilizing farmland. This can have broad application to aquaculture, including seaweed, mollusks, and fish but can also help with reinvigorating natural ecosystems. A significant increase in upwelling could serve to help re-establish fish stocks, even in the presence of substantial fishing, and the higher trophic animals, such as whales, that depend upon them. Cool and clean water raised from the depths can also directly improve the health of various ecosystems, for example, reduce lice in fish farms or mitigate warming events that might cause coral bleaching. Similarly biological material that filter feeders consume can often increase with depth.

Water has a high density and specific heat capacity. Very low energy flows can transfer a huge amount of thermal energy. There is on the order of a 100,000× multiplier between energy driving a flow and thermal energy carried by the flow and this has direct implications for climate change mitigation. For example, cooling the surface waters in a given location can have a direct impact on the local atmospheric environment, including influencing air temperature, cloud cover, precipitation, and so forth. Pumping cooler waters onto the continental shelf can serve to directly slow the general movement of warmer waters towards the poles and thereby the migration of many species that are sensitive to water temperature.

In extreme cases artificial upwellings can be used to directly impact global climate. For example, cooling surface waters can directly prevent the warm surface waters that drive the creation of hurricanes, thereby preventing them from occurring. Or cooling waters in front of a glacier might insulate and shield that glacier from warm sea waters and thereby slow the rate of ice loss. Large scale artificial up and down-wellings can also be used to directly modify ocean currents, for example, slowing ocean currents in and out of the Arctic, thereby leading to a cooling of the Arctic, an increase in Arctic ice coverage, and an increase in albedo which will act to cool globally.

BRIEF DESCRIPTION OF THE DRAWINGS

FIG. 11 illustrates an example of an upweller system having a mooring system coupled to a central hub of the upweller system.

Figure 1:
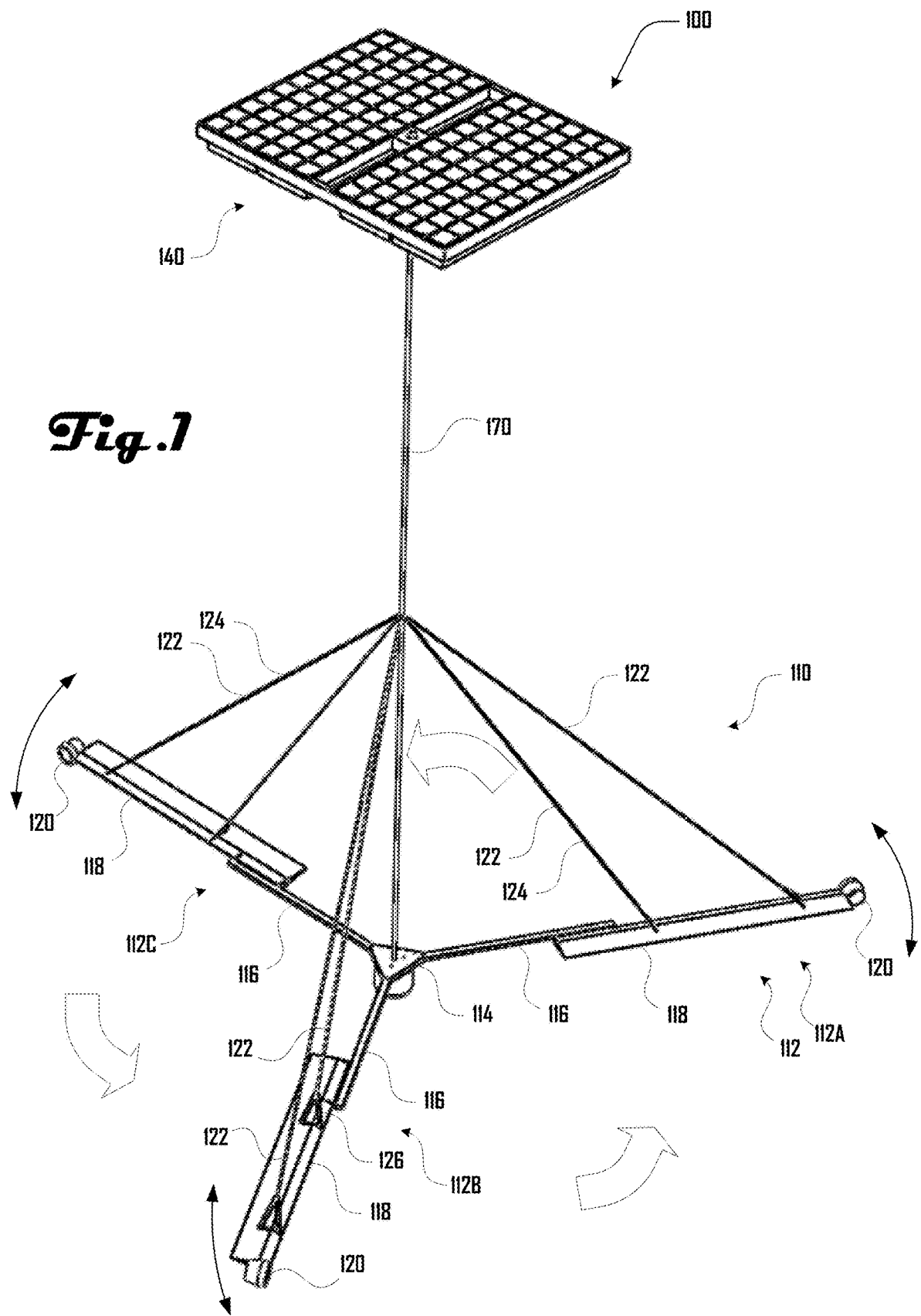
FIG. 1 illustrates an embodiment of a hydrofoil rotor system that comprises a hydrofoil rotor that is coupled to a buoy via a tether.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Surface waters can be low in nitrates, especially during the summer, but below the mixed photosynthetic zone, nitrate levels can quickly increase. By bringing deeper cooler nutrient rich water to the surface, yield of water-based agriculture systems can be greatly increased. Various embodiments disclosed herein related to upweller technology that uses wave and solar energy to drive a large suspended hydrofoil rotor that pumps deeper water to the surface. Some examples look like an inverted ceiling fan and each wave that passes lifts a surface buoy up and down, pumping hydrofoil blades that flap like a bird's wings and drive a rotor around. Being large in diameter, the upweller of some examples is capable of high flow rates, and at low capital cost. Depending on available wave energy, nutrient profile, and pycnocline, nitrate delivery at the equivalent of $10 to $100 per ton is achievable. This technology in some examples allows for year-round growth of seaweeds, with cool nutrient rich waters brought to the surface during the summer months when growth normally slows down. Yield can be dramatically increased and made more consistent in various examples.

Various embodiments can enable seaweed farming at terrestrial farming scales. These can include a solar powered upwelling device that brings deep, cool, nutrient rich water to the surface where it can dramatically increase yield. Seaweed farming can have direct access to an effectively unlimited resource of nitrates and in various examples can produce yields an order of magnitude greater than terrestrial farming, especially for protein. Seaweed farms can replace large areas of farmland, allowing for its return to nature, and removal of atmospheric carbon dioxide, while generally improving the ocean ecosystem and acting as a nursery for many fish species. It can be a high impact solution for mitigating climate change, recovering natural ecosystems, and feeding the world.

For example, beyond seaweed farming, such technology can be used for environmental protection and rehabilitation, including regeneration of natural kelp forests, protection of coral reefs from warming events, revitalization of local fish stocks via increased phytoplankton production, general protection from climate change, and the like. The cooling energy of the upwelling device can be 100,000 times the pumping energy. That is, a 10 kW upweller device 15 meters in diameter can bring 1 GW of cooling water to the surface in some examples.

One aspect of the present disclosure entails example embodiments of a hydrofoil rotor, that is suspended beneath a surface buoy that moves up and down with the waves. As the buoy and connecting tether move the hydrofoil rotor up and down, the blades flap in a manner reminiscent of a bird flapping its wings, and in so doing, the rotor can be propelled forward to rotate. Thus, the rotor can become a large diameter free flow propeller that in various embodiments pumps water up towards the surface in a somewhat columated jet flow which may well remain somewhat columated for as far as ten times its initial diameter in some examples, which can be similar to the jet wash behind an aircraft propeller or in front of a cooling fan.

The rotor can be weighted so as to naturally sink. The blades in various embodiments are generally free to pivot (e.g., forward of the center of lift) and the rotor can be weighted so that the blades naturally pitch down when the upward bridle tension from the surface buoy is diminished. This can allow the blades to feather to a low drag angle, and can allow them to sink faster. When tether tension is increased, for example, by the upward motion of the surface buoy over a wave, in various embodiments chordwise primary bridles to the hydrofoil blades can passively pitch the blades to an optimal angle of attack for generating lift that pushes water upward.

Water has over 800 times the density of sea level air and the loads on the hydrofoils can be substantial. Spanwise secondary bridles, that can take multiple forms, can be used to distribute load over the span of the blade, which in some examples can greatly reduce the bending load on the blade, and can reduce blade structure, mass, and cost. Especially at larger scales, structurally this is not dissimilar to a suspension bridge.

Turning to FIG. 1, an embodiment of a hydrofoil rotor system 100 that comprises a hydrofoil rotor 110 that is coupled to a buoy 140 via a tether 170. In the example of FIG. 1, the hydrofoil rotor 110 is shown comprising a plurality of blade assemblies 112A, 112B, 112C extending radially from a central hub 114. The blade assemblies 112 in this example include a shaft 116 that extends from the central hub 114 that is connected to a blade 118 having a thruster 120 disposed at a terminal end of the blade 118.

In various embodiments, the blade assemblies 112 can be configured to pitch up and down. For example, the blade assemblies 112 in some embodiments can pitch relative to an axis defined by the tether 170 with one configuration having the blade assemblies 112 disposed within a common plane that is perpendicular to the axis defined by the tether 170 with other configurations having the blade assemblies 112 at an angle relative to the axis defined by the tether 170 (e.g., 0°, 10°, 20°, 30°, 40°, 50°, 60°, 70°, 80°, 90°, 100°, 110°, 120°, 130°, 140°, 150°, 160°, 170°, 180°, and the like). In some embodiments, the blade assemblies 112 can be configured to pitch up and down passively (e.g., via a hinge, axle, or the like at the central hub 114) in response to the buoy 140 moving up and down on the top of a body of water (e.g., in waves of an ocean, lake, river, or artificial body of water) relative to the hydrofoil rotor 110. In some embodiments, the blade assemblies 112 can be configured to pitch via an electric motor, fluidic actuator, or the like.

In various embodiments, pitching of the blade assemblies 112 can cause the blade assemblies 112 to rotate (e.g., about an axis defined by the tether 170). Such rotation force can be imparted passively based on the configuration of the blade assemblies 112 and/or based on active rotational force generated by a motor, or the like. Accordingly, as discussed herein, in some examples the blade assemblies 112 can act as a free flow propeller that pumps water up towards the surface of a body of water that the hydrofoil rotor 110 is disposed in. Such a flow can have a columated flow configuration in various examples.

In various embodiments, the blade assemblies 112 can be configured to rotate (e.g., about a central axis defined by the shaft 116 of the blade assembly 112). Such rotation can be passive and/or active in some embodiments (e.g., via a motor). In some examples, such a rotation of the blade assemblies 112 can allow the blades 118 to feather to a higher or low drag angle, which can allow the blade assemblies 112 to sink faster or provide less resistance to pitching downward away from the buoy 140 faster; provide more resistance to pitching downward; provide less resistance to pitching upward; provide more resistance to pitching upward; provide less resistance to rotation of the hydrofoil rotor 110; provide more resistance to rotation of the hydrofoil rotor 110; or the like.

Figure 2:
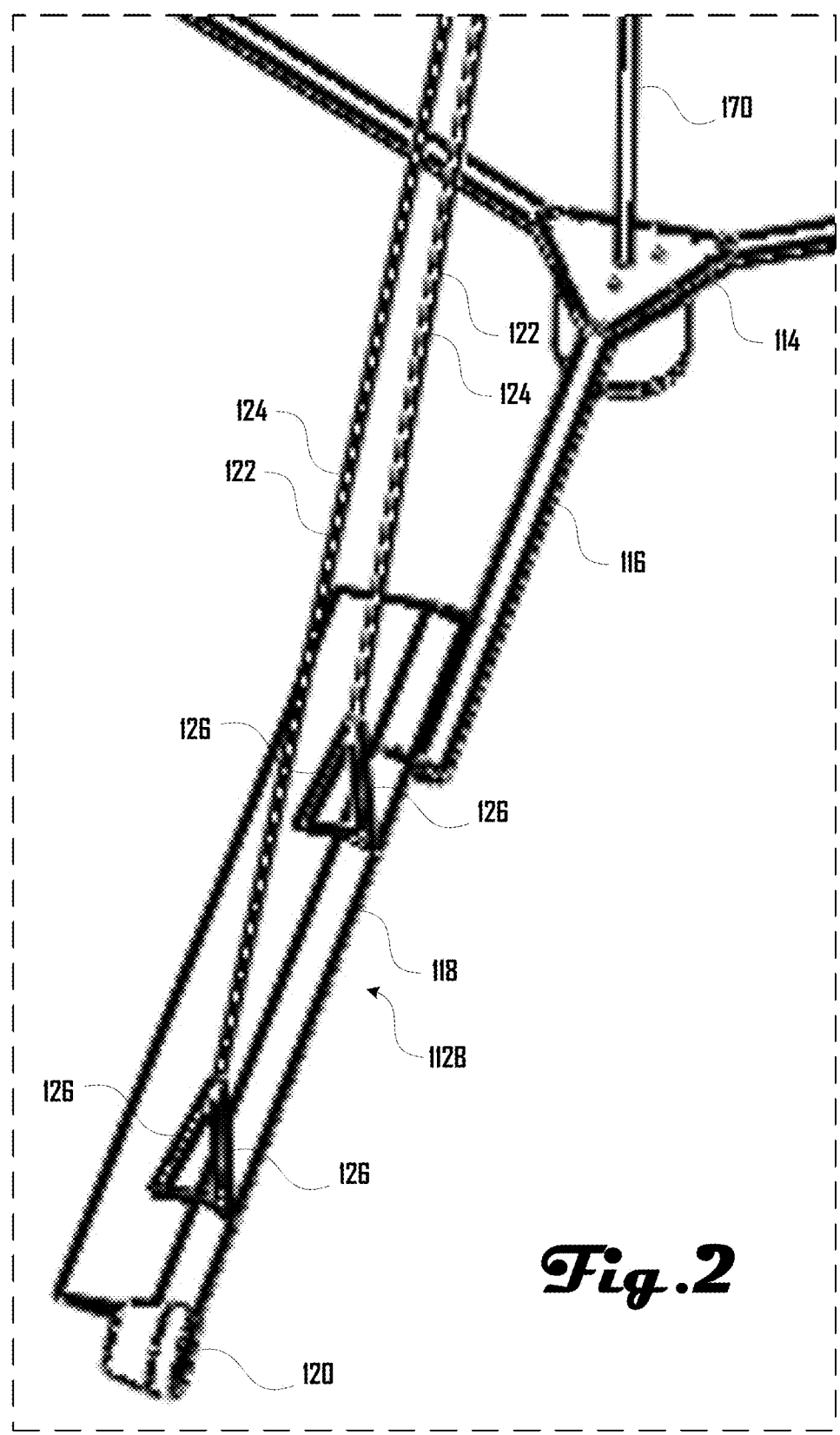
FIG. 2 is a close-up view of the bridals and a blade assembly of the hydrofoil rotor system of FIG. 1.

As shown in FIGS. 1 and 2, in various embodiments one or more bridle assemblies 122 can extend from the tether 170 to the blade assemblies 112. For example, the bridle assemblies 122 can comprise a primary bridle 124 that extends chordwise from the tether 170 with a two or more of secondary bridals 126 that extend from the primary bridle to locations on a blade 118. In various embodiments, spanwise secondary bridles 126, can be configured to distribute load over the span of the blade 118, which in some examples can reduce the bending load on the blade 118, and can desirably allow for a reduced mass, and cost of the blade assembly 112.

In some embodiments, the thrusters 120 at the terminal ends of the blade assemblies 112 can comprise motors, or the like, that can be configured to actively generate rotation of the hydrofoil rotor 110, slow rotation of the hydrofoil rotor 110, move the hydrofoil rotor 110 in a body of water, or the like. Some embodiments can include one or more passive rings, cylinders, pods, fins or winglets that stabilize the blade assemblies 112 in addition to or in place of thruster 120. Such stabilization and/or movement structures can be located at other suitable locations on a hydrofoil rotor system 100 instead of or in addition to the terminal ends of the blade assemblies 112 such as or along the length of the blades 118.

In various embodiments, the tether 170 can comprise a rigid flexible member such as a cable or rope, which has some ability to bend or flex while providing a strong coupling between the hydrofoil rotor 110 and buoy 140. For example, such a tether 170 can provide for a maximum radius of the hydrofoil rotor 110 from the buoy 140, with flex of the tether 170 allowing the hydrofoil rotor 110 to move within this maximum radius at least a bit (e.g., when the buoy 140 moves up and down on waves in a body of water). However, in further embodiments, the tether 170 can be ridged and substantially inflexible, such that the hydrofoil rotor 110 is held substantially at a maximum radius from the buoy 140 via the tether 170.

While some embodiments can have a tether 170 of a fixed length, further embodiments can be configured to change the length of the tether 170 such that a maximum distance between the buoy 140 and tether 170 can be changed. For example, in some embodiments the buoy 140 can comprise a winch that allows a length of the tether 170 (e.g., rope, cable, or the like) to be retracted or extended.

While the hydrofoil rotor 110 can be completely passive in some embodiments (e.g., lacking active structures and/or electric or fuel powered elements), in some embodiments the hydrofoil rotor 110 can comprise powered elements configured to move portions of the hydrofoil rotor 110 as discussed herein, sensors to obtain data, interface elements, or the like. For example, in some embodiments, the hydrofoil rotor 110 can comprise one or more temperature sensor, motion sensor, accelerometer, compass, flow sensor, GPS unit, depth sensor, conductivity sensor, hydrophone, light, speaker, screen, sonar, camera, and the like.

In various embodiments, such elements can be powered via one or more of a battery at the hydrofoil rotor 110; a power line extending to the hydrofoil rotor 110 via the tether 170 from the buoy 140; a battery at the buoy 140; a power line to a base station (e.g., in a body of water such as ship, boat or platform or a land-based station), or the like. Power sources can include batteries, renewable energy sources (e.g., solar, wind, wave action, currents, or the like), or an electrical power grid. In some embodiments mooring line tension variation can be coupled to vertical tether motion to additionally extract power from non-vertical buoy motion in waves.

Additionally, communication to and/or from such elements can include wired and/or wireless communication. For example, via one or more of wired connections at the hydrofoil rotor 110; a wired connection extending to the hydrofoil rotor 110 via the tether 170 from the buoy 140; a wired connection to a base station; a wireless connection to a base station from the buoy 140; a wireless connection from the buoy 140 to the hydrofoil rotor 110; and the like. In some embodiments, portions of the hydrofoil rotor system 100 (e.g., hydrofoil rotor 110 and/or buoy 140) can comprise a computing system that comprises one or more of a processor, memory storing instruction that when executed allow for various functionalities, a communications module, a power source, and the like. However, in some embodiments, such elements can be specifically absent.

In various embodiments, a hydrofoil rotor 110 can operate at a depth of up to ten times its diameter, with further embodiments operating at 5, 6, 7, 8, 9, 10, 15, 20 times the diameter of the hydrofoil rotor 110. The diameter of a hydrofoil rotor 110 of some embodiments can range from a few meters to over a hundred meters, with larger diameters being preferred at greater depths in some examples to maintain coherent upwelling plumes. For example, in some embodiments a hydrofoil rotor 110 can be in a range of 5 to 30 meters in diameter with further embodiments having a diameter of 0.25 m 0.5 m, 1 m, 2 m, 5 m, 10 m, 20 m, 30 m, 50 m 100 m, 150 m, 200 m, 250 m, or a range within such values.

Rotor operating depths in some examples can be in a 30 to 150 meter range, which can be based on various factors, such as ocean depth, thermoclines/pycnoclines, and useful nutrient increases with depth. Further embodiments can operate at a depth of 1 m, 2 m, 5 m, 10 m, 20 m, 30 m, 50 m 100 m, 150 m, 200 m, 250 m, 500 m, 1000 m, 2000 m, 3000 m, 4000 m or a range within such values. The tether 170 can accordingly be configured for such operating depths or ranges. Deep ocean operation can access higher nutrient concentrations in some examples. Larger systems 100 of some embodiments may become proportionately heavier and more expensive and logistically more challenging but may have lower fixed costs, which can make such systems desirable.

In horizontal current flows, in various embodiments, one side of the rotor can experience faster flows than the other. This can result in one side of the hydrofoil rotor 110 generating more lift than the other, which can cause the hydrofoil rotor 110 to tilt and thrust sideways. This can further lead to instabilities in rotation of the hydrofoil rotor 110. Cyclic pitch control can be one method of mitigating such instabilities, along with high rotor tip speed which can diminish the effect. Another method available in some embodiments of a bridled upweller design can be to cone the hydrofoil rotor 110 such that the blade lift force vector passes closer to the swivel point of the buoy 140. This can act in some examples to reduce the blade lift moment that might otherwise act to tilt the hydrofoil rotor 110.

Higher aspect ratio hydrofoil blades 118 can have lower chord and can be lighter, faster, and more efficient in some examples. However, a tradeoff can ensue in some examples with respect to marine animal endangerment. Generally, a lower speed can be desirable to reduce this risk leading to larger blades 118, and in some examples more blades 118, if solidity needs to be further increased to achieve the desired performance. Different more compliant materials, especially at the leading edge, can also be used in various embodiments to reduce the consequences of marine animal impact.

Blade twist, in some examples, can be incorporated into a propeller or hydrofoil rotor 110 so as to optimize blade angle of attack along the span and accommodate a constant speed flow across the swept area of the propeller disc. Blade twist can be problematic for some embodiments of a pitch flapping blade that must also feather for downward motion. Constant pitch along the span of a blade assembly 112 can reduce efficiency in some examples. One method of mitigation in various embodiments can be to allow the blade assembly 112 to torsionally flex such the blade twist varies with the pitch flapping motion. Primary bridles 122 that automatically pitch the blade to an optimal angle of attack can help with this in some examples. Some embodiments can include non-constant speed flow along the propeller or hydrofoil rotor 110 radius, which can be a departure from traditional actuator disc assumptions—the vertical flow speed near the central hub 114 can be less than that near the tip of the blade assembly 112. Indeed, in various embodiments, the blade tips sweep most of the area and do most of the work and the hydrodynamics near the central hub 114 can be less critical. High hydrodynamic performance near the central hub 114 is not critical in some examples and can be traded for other design priorities like structural needs and cost.

Thrusters 120 can be added to the hydrofoil rotor 110 in some embodiments, for example, at the tips of the blades 118, so that the hydrofoil rotor 110 can be powered concurrently and independently of wave action. A winch that pulses a main tether 170 can similarly be used to pump and power the hydrofoil rotor 110 independently or in conjunction with wave action. The thrusters, 120 (e.g., electric), can be powered by an independent power supply in some embodiments, for example, by a generator set, boat electrical power supply, or shore connected power transmission cable as discussed herein. In some embodiments, thrusters 120 can be powered by a solar array built into the surface of a wave buoy 140, and in some examples, in conjunction with a battery storage system. Solar power in various embodiments can significantly increase upwelling during the summer months when solar energy is generally higher, wave energy often lower, and when the nutrient and pycnocline is often most pronounced. Thrusters 120, in some examples, can also reduce the need for added mass on the rotor 110 to help maintain rotor speed during downward motion. In braking mode, thrusters 120 in various embodiments can be used to slow and depower the rotor 110, which in some examples, can be useful in extreme conditions, can be useful in the presence of potential collisions, for example, with a marine animal. In some embodiments, thrusters 120 can be powered by one or more wind turbines which in some embodiments can be integrated with the buoy 140.

Control algorithms can be implemented in various embodiments that pulse rotor electric thrusters 120 as a function of rotor rotation angle. This can enable a robust method of cyclic control at little additional cost. For example, by cyclically increasing thrust on one side of the rotor 110 the rotor disc can be actively rotated off the vertical axis, resulting in an off vertical thrust vector that can be used to provide a horizontal thrust component via the tether 170 and/or be used to deflect a horizontal current in a vertical direction. A horizontal thrust component can be used in some examples to actively move the upweller system 100, including buoy 140, to reduce loads on the anchored structure, to convert current power into upwelling power, or the like.

In some instantiations, two or more thrusters 120 can be attached, for example, one above and one below the blade 120, such that differential thrust can be used to alter blade pitch. Actuated tail planes can similarly be used for blade pitch control. This can, in some examples, be used for direct collective and cyclic control of blade pitch. In some examples, it can enable a blade feathered mode that depowers the rotor 110 and stops it from rotating. Such an embodiment can, for example, be of use in response to external triggers and automatic and manual shutdown.

In some cases, electric thrusters 120 can be used as generators, extracting power from the rotation of the rotor 110. This can enable power generation from waves and currents, and in some examples, at levels sufficient to power external systems, if desired. In some cases, this power can be used to power onboard systems, in others it can be used to amplify cyclic control, by also using the thruster 120 as a pulsed drag brake. In some cases, drag brake thruster operation can be used as an emergency braking system for the rotor 110 itself, for example, to reduce marine animal risk and entanglement. Drag brake operation does not necessarily require external power and can even generate net power in some examples.

The upweller system 100 in various embodiments can use a two, three, or more point mooring system, which in some examples can be combined with submerged buoys to maintain mooring line tension and keep the mooring lines clear of the upwelling device. In some examples, the upweller system 100 can be directly integrated into other floating structures (e.g., an aquaculture unit or array) so as to reduce additional components and costs. The upweller system 100 in some examples may also be moored from below with a single point mooring attached to a point below the rotor 110 and be provided with enough scope of line or chain, etc. to accommodate vertical motion of the rotor. Such embodiments may include an underwater swivel system. Elastomeric moorings can be used in various embodiments, and in some cases, this can reduce the need to weight the rotor.

Figure 3:
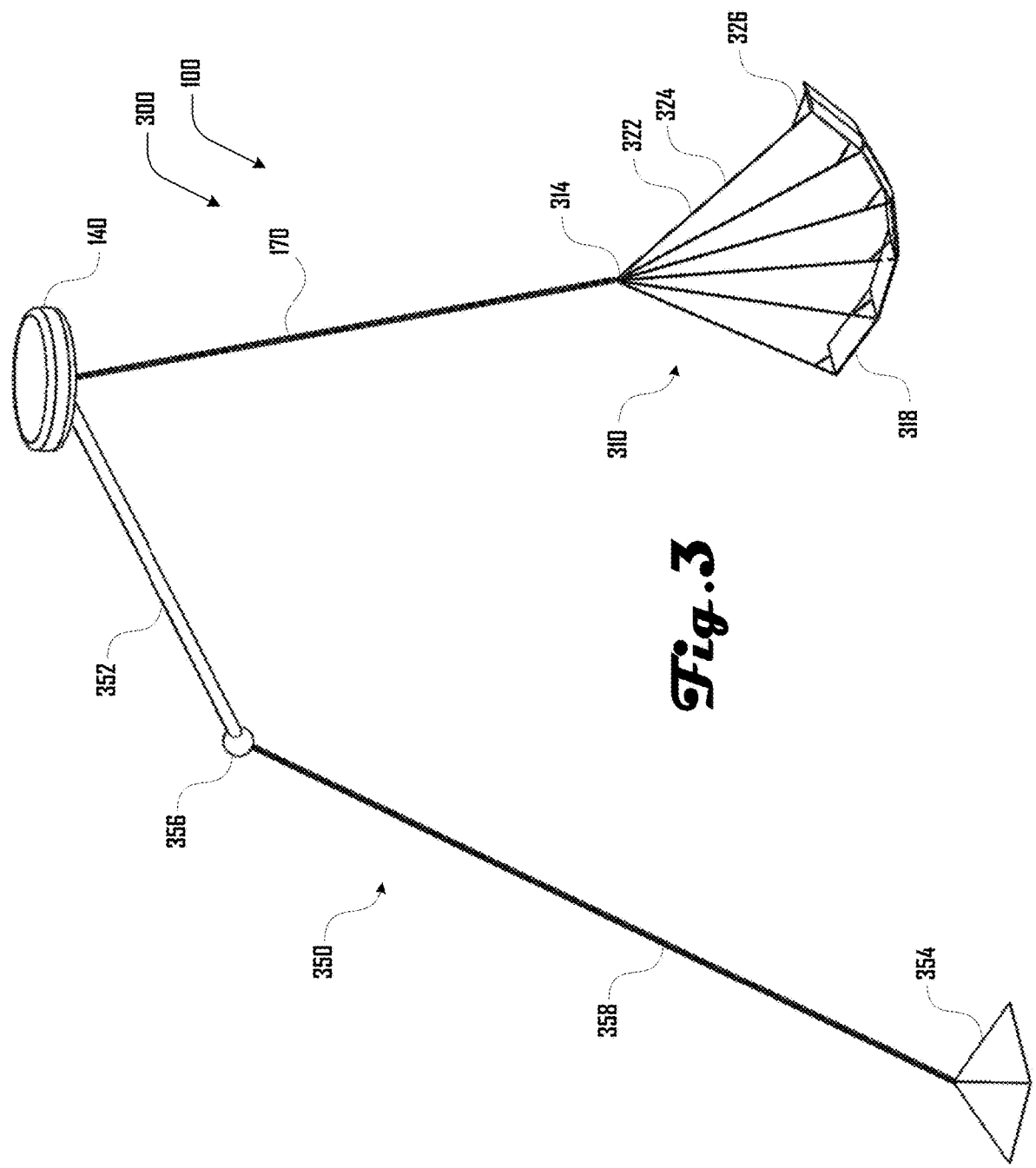
FIG. 3 illustrates an embodiment 300 of an upweller system 100 that comprises bridled wing 310 coupled to a buoy 140 via a tether 170.

For example, as shown in the embodiment 300 of FIG. 3, a bridled wing 310 can be coupled to a mooring system 350 via a mooring shaft 352 attached to the buoy 140. A mooring anchor 354 can be coupled to an end 356 of the mooring shaft 352 via a mooring tether 358. In another example, as shown in the embodiment 600 of FIG. 6, a wing 400 can be coupled to a mooring system 350 via a mooring shaft 352 attached to the buoy 140. A mooring anchor 354 can be coupled to an end 356 of the mooring shaft 352 via a mooring tether 358 with a mooring float 650 coupled to the end 356 of the mooring shaft 352.

Mooring anchors 354 can be installed in various suitable ways including an anchor installation ROV, such as disclosed in U.S. patent application Ser. No. 17/159,632, filed Jan. 27, 2021, entitled "VEHICLE FOR INSTALLING ANCHORS IN AN UNDERWATER SUBSTRATE," which application is hereby incorporated by reference herein in its entirety and for all purposes.

Figure 9:
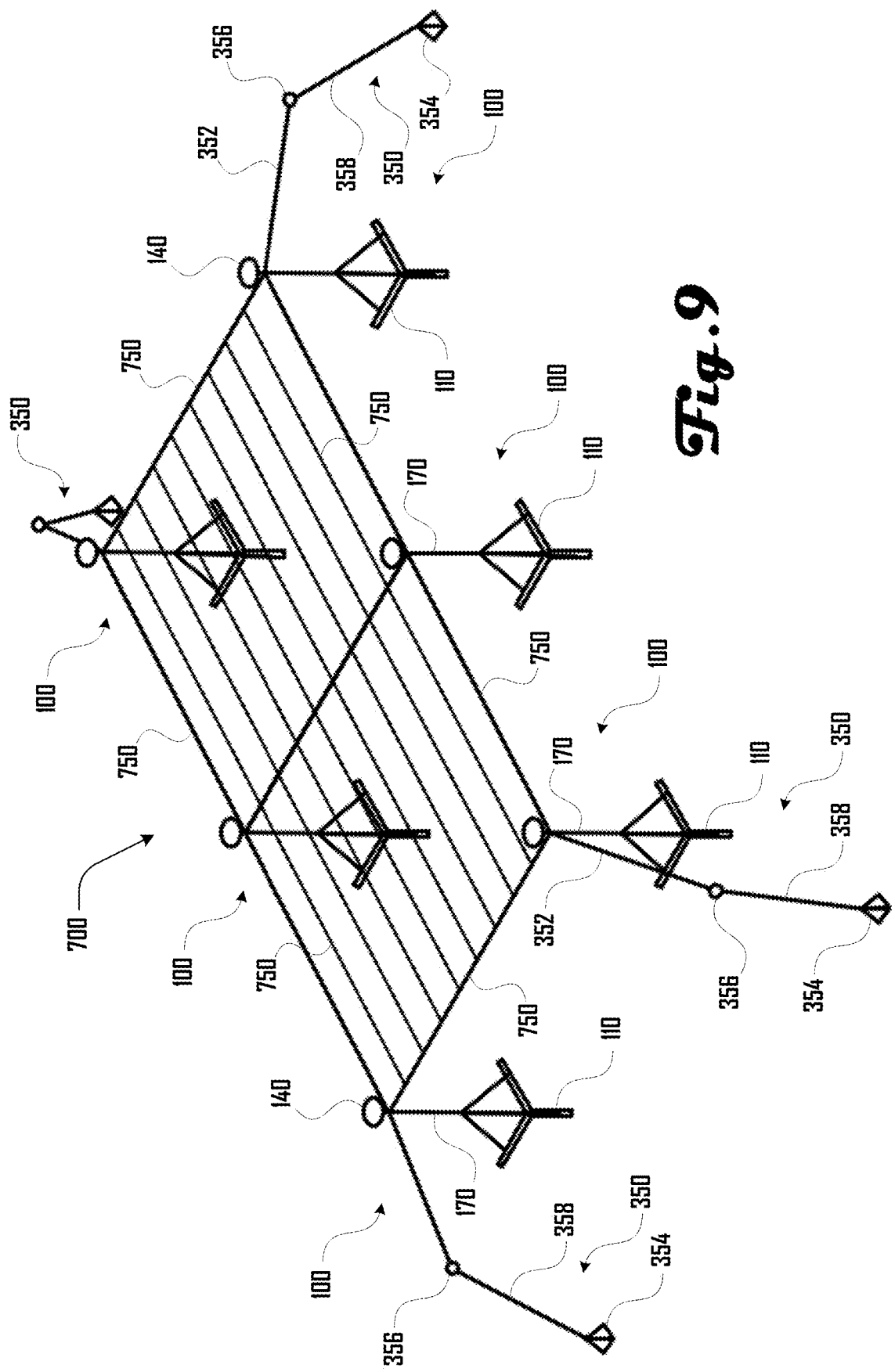
FIG. 9 illustrates an example of an upweller array anchored to a seabed via a plurality of mooring anchors.
Figure 10:
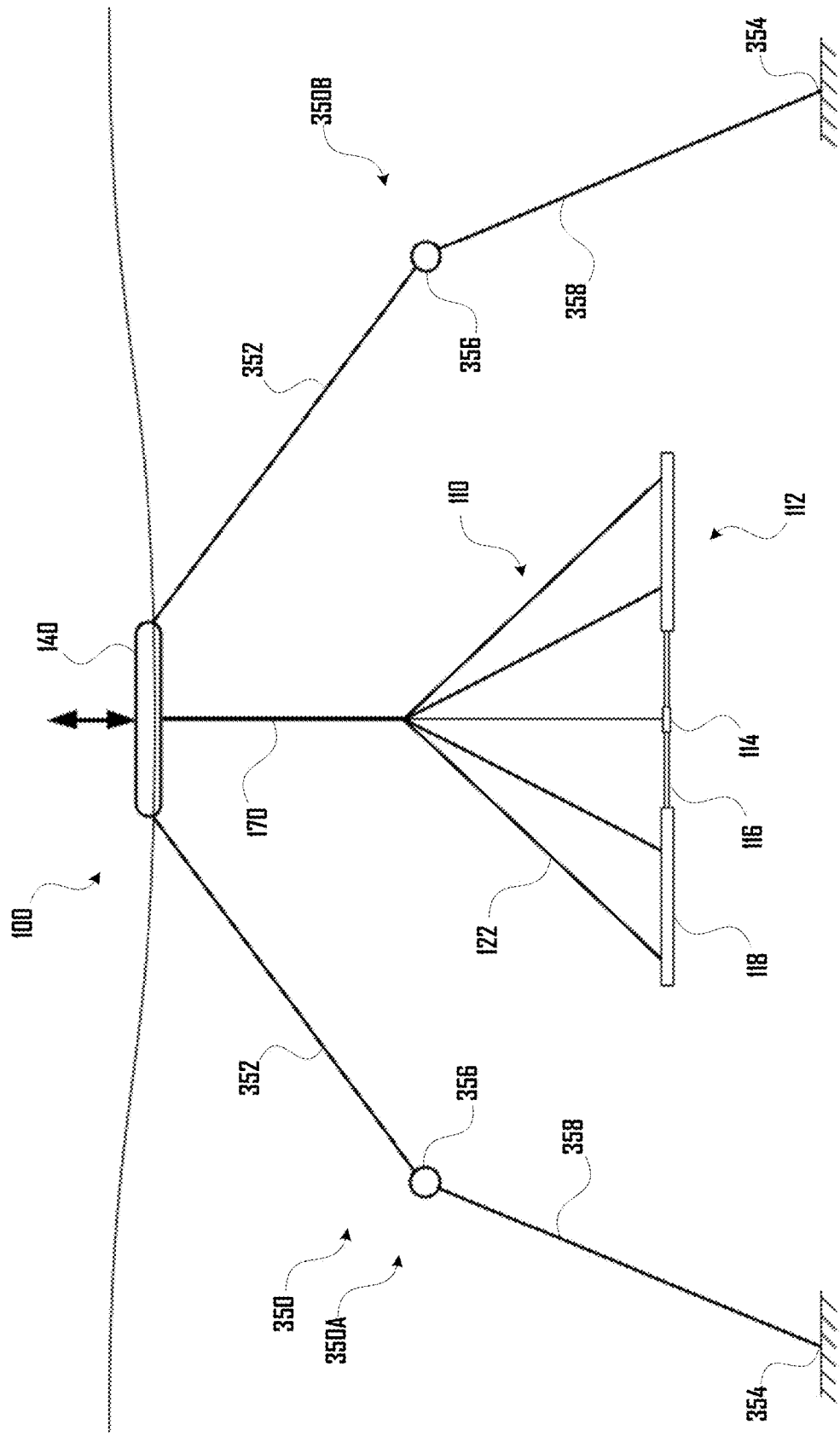
FIG. 10 illustrates an example of an upweller system having a first and second mooring system coupled to a buoy of the upweller system.

A mooring system 350, or the like, can be used in various embodiments having one or more upweller systems 100. For example, FIG. 9 illustrates an example of a plurality of mooring systems 350 used to position an upweller array 700. FIG. 10 illustrates an example of an upweller system 100 having a first and second mooring system 350A, 350B coupled to the buoy 140 of the upweller system 100. In some embodiments, the mooring systems 350A, 350B can be coupled to opposing sides to the buoy 140 (e.g., 180°) or can be coupled at any suitable angle from each other (e.g., 50°, 60°, 70°, 80°, 90°, 100°, 110°, 120°, 130°, 140°, 150°, 160°, 170°, 180°, and the like). In further embodiments, one or more mooring systems 350 can be coupled to various other elements of an upweller system 100 such as the central hub 114 as shown in FIG. 11. In further embodiments, any suitable plurality of mooring systems 350 can be coupled to the buoy 140, central hub 114, or other location, including 2, 3, 4, 5, 6, 7, 8, 9, 10, 20, 30, 50 or the like. Also, mooring systems 350 can be configured in various suitable ways in further embodiments and the examples herein should not be construed as being limiting. Additionally, as discussed herein, the term array should not be construed to require a plurality of upweller systems 100; accordingly, in some embodiments, and upweller array 700 can comprise a single upweller system 100 or any suitable plurality of upweller systems 100.

Cyclic control of the rotor can allow the upweller system 100 in various examples to be deployed with a single point mooring system, using cyclic control and thruster power to help ensure that the rotor 110 does not entangle the mooring line. Compressive structure-based mooring line members can also make this possible in various examples—prevent rotor mooring line entanglement. In some instantiations, cyclic control can provide independent station keeping, allowing the upweller system 100 to convert wave and solar power, for example, into forward thrust that allows the upweller system 100 to move and navigate under its own power. Generating high thrust at low speed in some examples can be used to control the position and speed of floating structures; for example, large free floating kelp farms. Similarly, the upweller rotor system 100 can be used in some examples as a virtual anchor for ships and other such floating platforms.

The upweller can be utilized as a (e.g., very large low speed) propeller, for example, in a tugboat like capacity to pull with high thrust at low speed. For example, wave, wind or solar power can be used to drive this; alternatively or in addition, this operation can be powered by boat power and thrusters on the upweller system 100, and similar and so forth. For example, the upweller might be deployed from a boat system 100, powered by the boat, and/or used to pull the boat, and anything else that might be attached to it, with high thrust at low speed, and with relatively low power use. Beyond active station keeping and tugboat like operations this approach can be used for pulling large aquaculture structures, and so forth. It can also be used in arrays or multiple systems might be deployed on demand to pull in multiple directions (see e.g., FIG. 7), and so forth. In various embodiments, this can be used for maintaining tension in tensile structures (e.g., a seaweed farm).

By tilting the rotor 110 off vertical it can be possible to convert currents directly into upwelling. The hydrofoil rotor disc can act as a large low aspect ratio hydrofoil that deflects current flow upward. In some cases, this can occur passively, with the drag on the collective rotor system 100 causing it to swing like a pendulum and tilt to an angle that causes this upward current deflection. In some examples, an extreme design load case can be addressed with an automatic depower system. Adding weight to the rotor system 100 can reduce the horizontal flow projected area of the hydrofoil blades 118, reducing this tilting in various examples. Cyclic control can also be used to control this current deflection in some embodiments.

In some cases, a separate pendulum mass and/or drag component can be attached to the rotor hub with connecting cables to the rotor blades attached in such a way as to alter blade pitch in response to pendulum movement. This can enable a simple mechanical method of cyclic control for mitigating current tilting of the rotor system 100. Coning of the blades 118 can also help with this in various examples. Similarly, in some embodiments the main bridles 122 and the surface swivel system can be used to enact cyclic control. For example, by angling the surface swivel in a given direction and using the bridles 122 to translate that angle into a cyclic control system. Helicopter-like swash plate systems can similarly be employed.

Wave height and period can directly limit the flow kinetic energy available to a rotor 110 in various examples. This may or may not match the local pycnocline and desired depth of operation. Rotors 110 can be staged at different depths to help mitigate this, including multiple rotors 110 on a single tether 170 and/or wave buoy system 140 and arrays of upweller systems 100 with different depth rotors 110 operating collectively (see e.g., FIG. 7). In various embodiments, it can be desirable to pump from greater depth in the deep ocean with a larger rotor 110, and greater wave energy may be available in the deep ocean that can make this easier to accomplish. An undersized rotor 110, with respect to wave energy and the pycnocline, can in some examples create a higher speed lower flow rate upwelling. Flow entrainment is possible in various embodiments. Some horizontal motion of the rotor 110 can be used in some examples to increase the effective swept area of the rotor 110. Like a helicopter in forward and perhaps circling flight. In various embodiments, the location of the axis of rotation can utilize precession. This can have mixing benefits in various examples.

Wave actuated motion of the upweller rotor 110 can result in a pulsating flow that might better facilitate mixing of the upwelling plume, as will the surface waves that drive this action. Direct drive of the rotor 110 via thrusters 120 can provide a more continuous flow, although blade element level flow distortions, including tip vortices, may still exist in some examples. The upwelling plume can move with any current in some examples and can in some cases re-submerge to some extent, if not adequately mixed, due to greater density of the upwelled water. The gravitational and potential energy of this flow can be somewhat conserved in various examples before ultimate dissipation and may in some cases result in an oscillating up and downward flow that may extend substantially down current. Various methods can be employed to increase plume mixing with the lower density surface waters, especially during the summer when this may be more pronounced. Including different blade designs and arrays of upweller systems 100 that repeatedly bring water to the surface, for example deployed at multiple depths, noting that with increased mixing the density gradient can be reduced and with it the energy required to upwell water.

Figure 7:
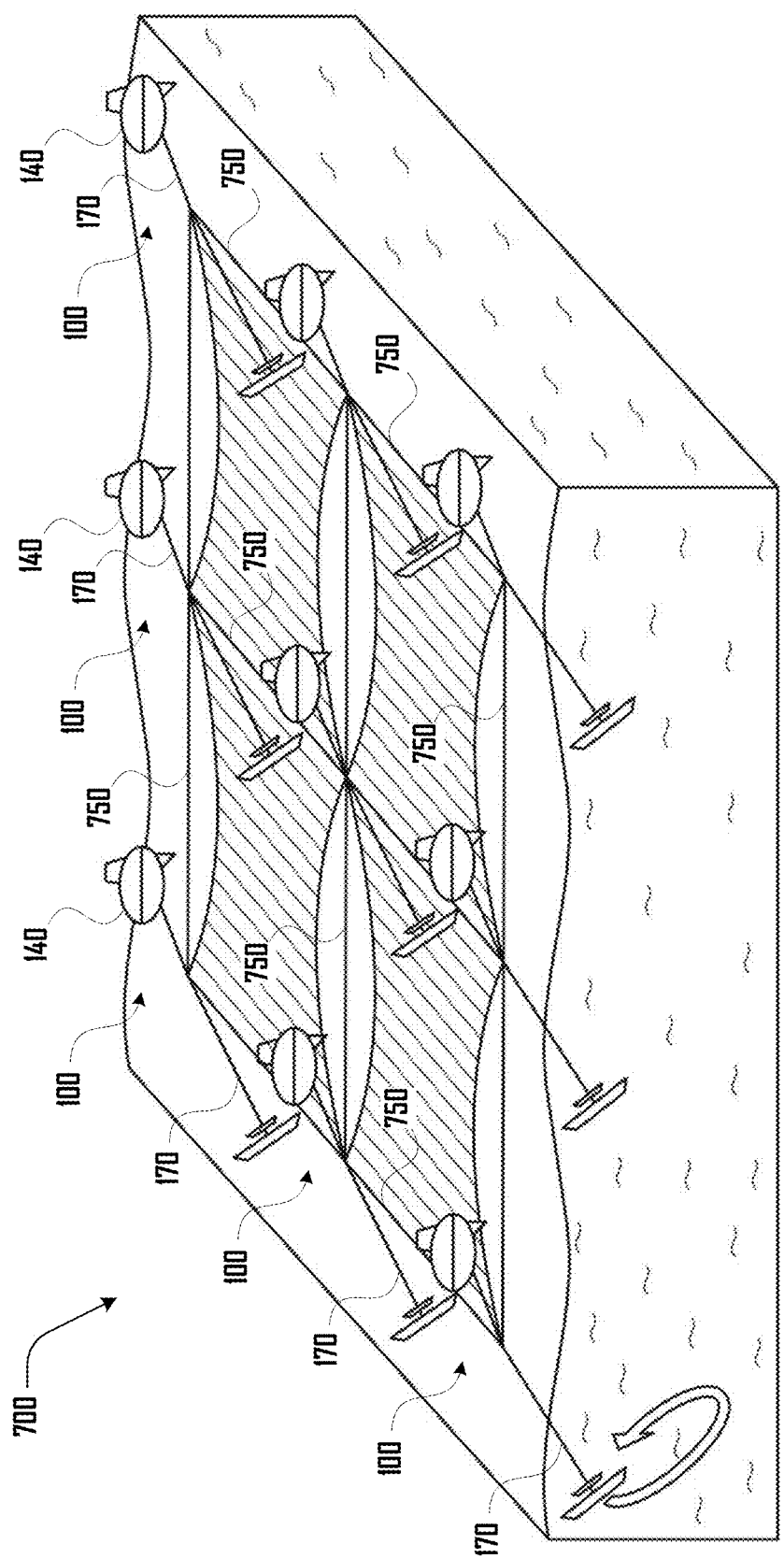
FIG. 7 illustrates an example of an upweller array comprising a plurality of upweller systems disposed in an array grid configuration and coupled via a plurality array lines.

For example, FIG. 7 illustrates an example of an upweller array 700 comprising a plurality of upweller systems 100 disposed in an array grid configuration and coupled via a plurality array lines 750. Such array lines can be configured to provide a physical coupling, transmit power and/or transmit communications. As shown in the example of FIG. 7, the upweller array 700 can be in a rectangular grid configuration, but in further examples, the upweller array 700 can be in other suitable configurations such as circular or in an array defined by various suitable regular polygons such as triangles, rectangles, pentagons, hexagons, heptagons, octagons, or the like. Also, while the example upweller array 700 of FIG. 7 includes nine upweller systems 100, further embodiments can include any suitable plurality of upweller systems 100, such as 2, 3, 4, 5, 6, 7, 8, 9, 10, 15, 20, 25, 50, 75, 100, 200, 500, or the like.

Figure 8:
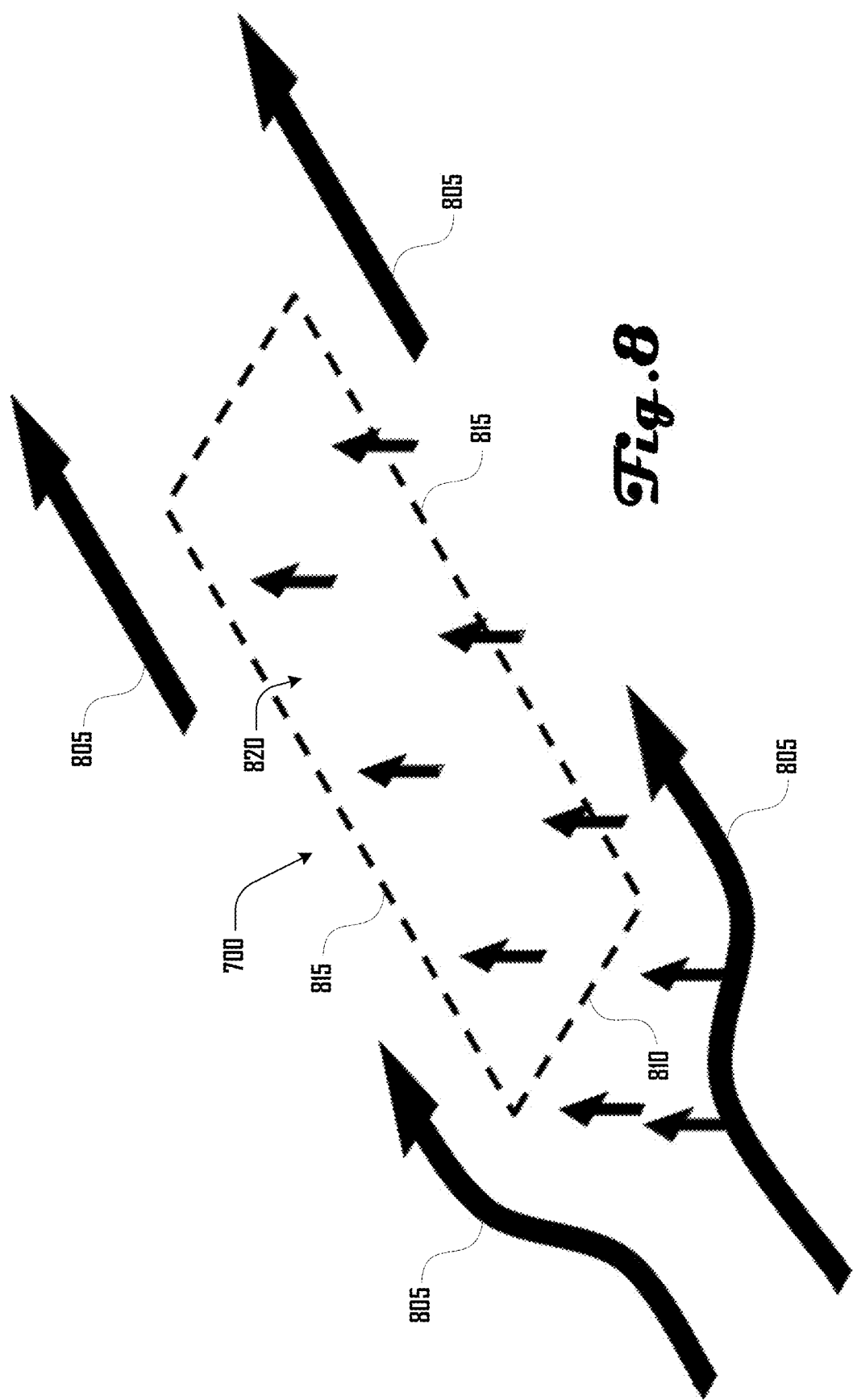
FIG. 8 illustrates an example of an upweller array having an elongated rectangular shape that allows currents to be deflected around a front face and along sides of an upwelling zone.

In some embodiments, an upweller array can take the form of a streamlined shape that allows current to be deflected around the upwelling zone with a minimum of drag, enabling a higher concentration of upwelled nutrients and reduced plume losses to the current. For example, FIG. 8 illustrates an example of an upweller array 700 having an elongated rectangular shape that allows currents 805 to be deflected around a front face 810 and along sides 815 of an upwelling zone 820. In various examples, an upweller array 700 can be oriented based on the direction of currents 805 such that a front face 810, or the like, is oriented into currents 805 so that the currents 805 are deflected around the upwelling zone 820 with a minimum of drag.

Such an upweller array 700 can be anchored to a seabed or other suitable base, which can prevent substantial movement of the upweller array 700 from a desired location. For example, FIG. 9 illustrates an example of an upweller array 700 anchored to a seabed via a plurality of mooring anchors 354. The upweller array 700 comprises a plurality of upweller systems 100 that are coupled together via a plurality of array lines 750 to define the upweller array 700. In some embodiments, a plurality of upweller systems 100 can be integrated into an anchored kelp farm in a configuration as shown in FIG. 9.

Conversely, for an unanchored actively moving upweller array 700 or upweller system 100, in some embodiments this can reduce the drag of the total system and enable higher speeds. An upweller array 700 can be configured in various suitable ways for deflection of currents and/or to generate higher speeds. For example, a front face 810 can be flat, rounded or pointed, with sides 815 being linear, rounded, or other suitable shape.

Multiple rotors 110 can also be stacked upon a single tether 170 and wave buoy 140, in some examples, which can be akin to compressor staging, allowing for greater pumping power to greater depths and greater surface mixing, if desired. For example, a rotor 110 near the surface can specifically be designed to increase mixing. Some rotor designs can be more effective at mixing than others, and rotor diameters, blade numbers, speeds aspect ratios, and wakes might be varied, for example, to better facilitate mixing. Many smaller upwelling devices 100 can be deployed near the surface of a body of water, for example, to hold and mix the upwelled water at the surface. In some cases, it is desirable to avoid mixing and to instead displace surface waters with deeper waters.

Because the upwelling plume can drift with the current, large arrays of upweller systems 100 (see e.g., FIG. 7) and large kelp farms, for example, can be more efficient in some examples at capturing a larger fraction of the nutrients that might be upwelled. There can be a scaling relationship, where with larger scale installations, more of the plume can be captured. This can pose difficulties for some embodiments of smaller scale installations. Nutrient plume that is not directly intercepted and utilized will likely serve to boost the local ecosystem.

The upwelling system 100 in various embodiments can create a plume that will disperse in some manner that will be a function of the current. With knowledge of the current and other ocean states, upwellers 100 might be positioned to better place the resultant plume or plumes in desired locations. For example, large upwelling systems 100 in some examples can be placed up-current of a kelp farm so that the resultant plumes largely reside over the kelp farm. In some cases, upweller systems 100 can be actively positioned so as to continuously adjust the location of an upwelling so as to maintain its location even in the presence of varying current strengths and directions.

Upweller systems 100 in various examples can transfer current momentum and flow between different depths. In some cases, upweller systems 100 can be used to control the current speed through a surface structure such as a kelp farm. For example, vertical flows can be used to create virtual streamlined low drag shapes or other current obstructions that shield surface structures from the full strength of a current flow, deflect current flow, or even amplify it. Current flow and distribution through a kelp farm can also be optimized in some embodiments to better facilitate nutrient uptake and growth.

Upweller vertical flow can be used as a virtual wave break in some examples. Similar to a hydraulic ramp, waves can be encouraged to break over a localized upwelling. This can be used as a method of protecting or shielding objects from waves, it can also be used as a method of creating waves in desired locations. In some embodiments, this can increase wave energy conversion for powering an upweller system 100.

Upwelling systems 100 can be combined with local geography to create more extensive upwellings in various embodiments. For example, upwelling at the entry to a bay, coincided with tidal currents, can effectively be used to upwell the entire bay. The plume effectively becomes geographically contained and constrained and it can be possible to control whether the water flowing into the bay is warm surface water or deep cool nutrient rich water. Upwelling of some examples can require depths that may not be available. In some locations, upwelling into a shallow area can be achieved by upwelling at depth just up-current of the shallow area. It can be possible to displace warm surface waters and upwell the shallow area even though it is shallow and does not have direct access to deep, cool, nutrient rich water.

While one preferred embodiment of a rotor has three blades 118 or blade assemblies 112 as shown in the example of FIG. 1 for example, the rotor 110 can use any suitable multitude of blades, and a hub 114 is not necessarily required in some examples. At one example extreme, a single blade rotor 110 can consist, comprise or consist essentially of a bridled wing that flies around in circles such as in FIGS. 3-6.

For example, FIG. 3 illustrates an embodiment 300 of an upweller system 100 that comprises bridled wing 310 coupled to a buoy 140 via a tether 170. The bridled wing 310 comprises a plurality of blade segments 318 coupled to an end 314 of the tether 170 via a plurality of bridal assemblies 322 that comprise a primary bridal 324 and a plurality of secondary bridals 326. As shown in the example of FIG. 3, the bridled wing 310 can be coupled to a mooring system 350 via a mooring shaft 352 attached to the buoy 140. A mooring anchor 354 can be coupled to an end 356 of the mooring shaft 352 via a mooring tether 358.

Figure 4:
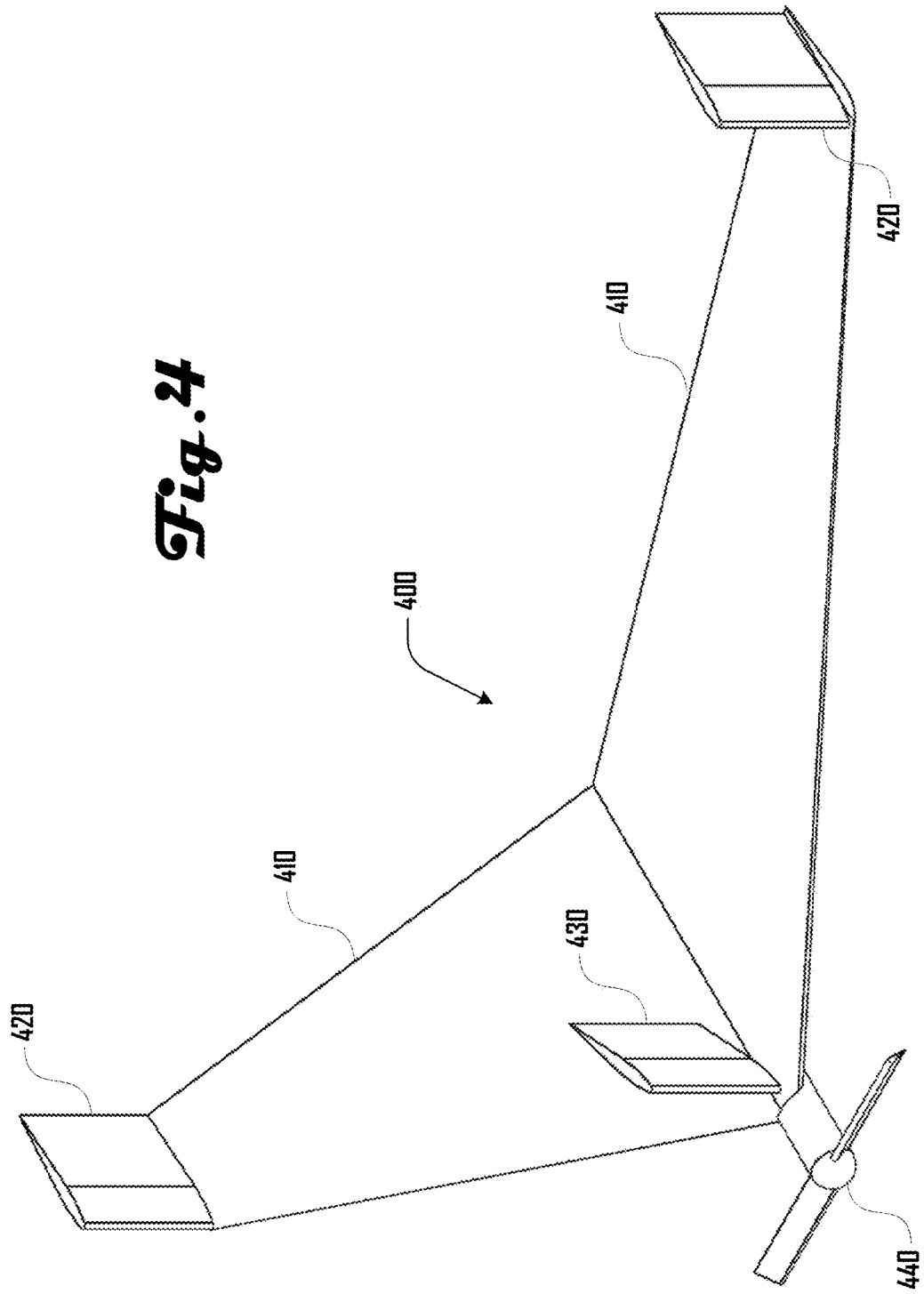
FIG. 4 illustrates an embodiment of a wing.
Figure 5:
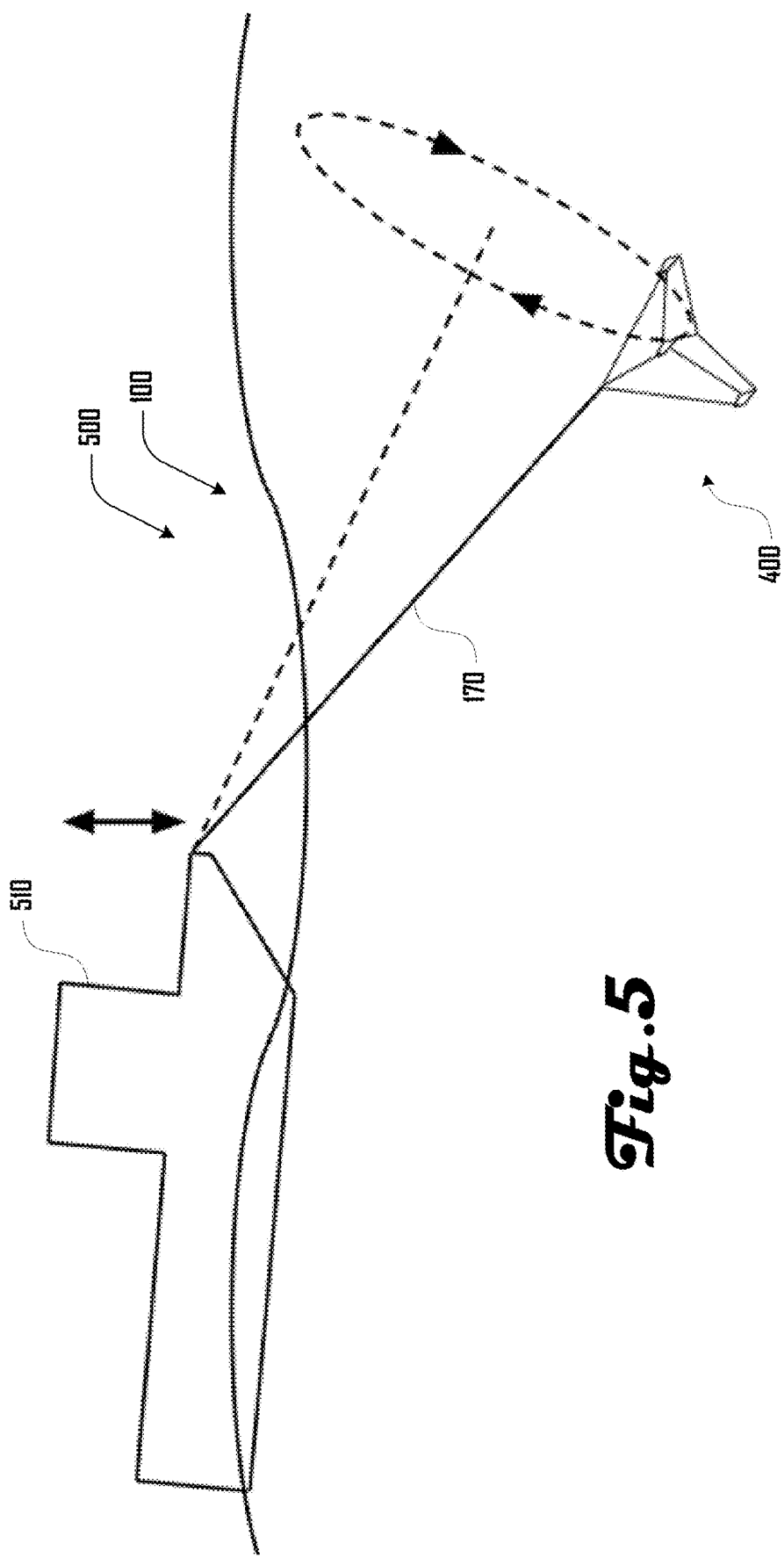
FIG. 5 illustrates a wing coupled to a boat in accordance with one embodiment.
Figure 6:
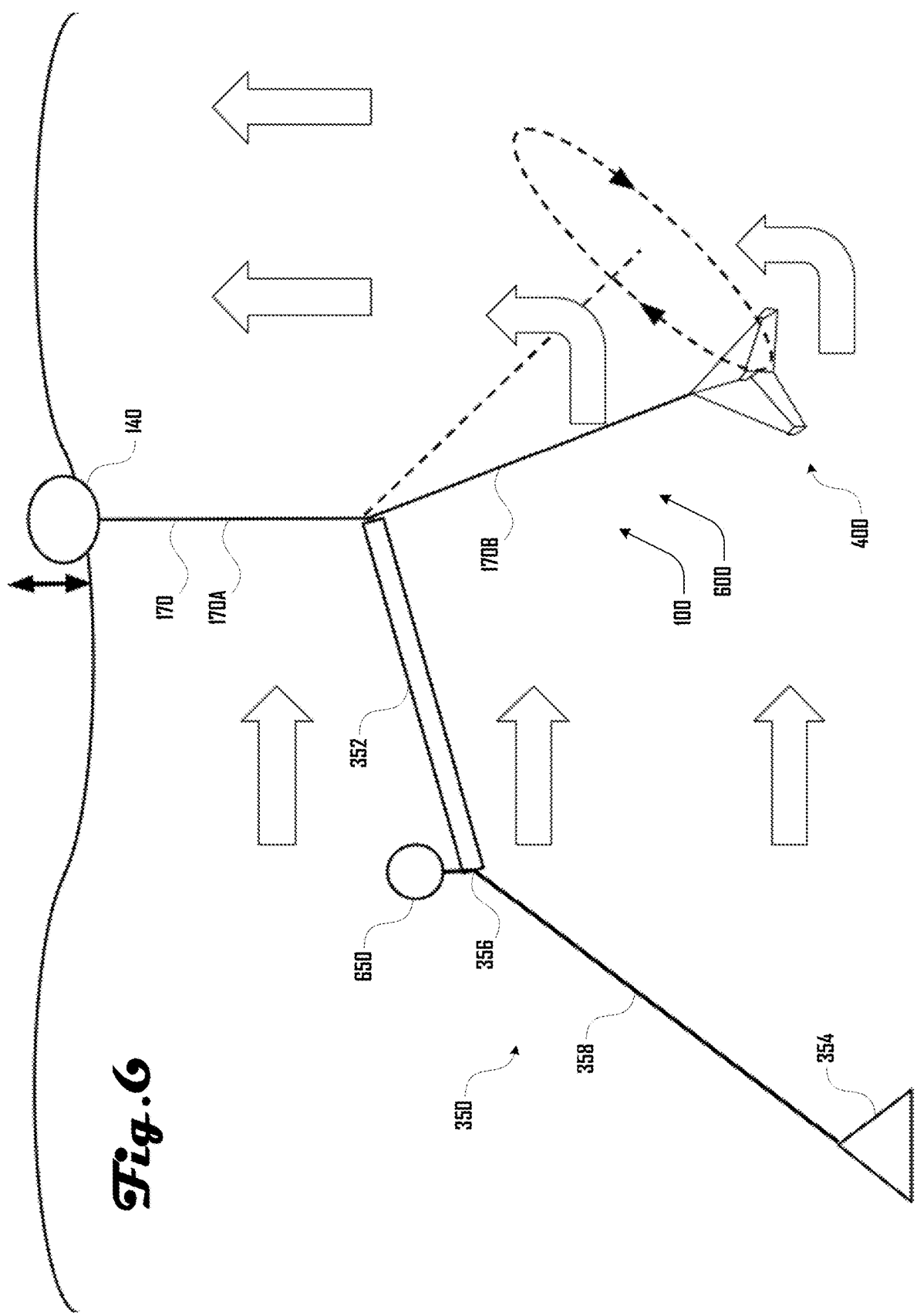
FIG. 6 illustrates a wing coupled to a mooring system in accordance with another embodiment.

In another example, FIG. 4 illustrates an embodiment of a wing 400 that can be coupled to a boat 510 in FIG. 5 or coupled to a mooring system 350 as shown in FIG. 6. As shown in FIG. 4, the wing 400 can comprise a pair of wing units 420 with tip-flaps 420 disposed at ends of the wing units 410. A central flap 430 can be disposed centrally between the wing units 410. The flaps 420, 420 can be configured to rotate or pivot, which can direct movement of the wing 400 within a body of water (see e.g., FIG. 5) via propeller 440.

An advantage of this in some examples can be that it becomes possible to actively vary the circling diameter and thereby the effective swept area and flow speed of the upwelling. Multiple bladed rotors 110 can have stability benefits with respect to a consistent axis of rotation.

Faired bridles 122 on the upweller device can be used in some embodiments to reduce bridle drag and increase rotor performance. For example, a bridle 122 can consist, comprise or consist essentially of a streamlined hydrofoil shape that has much lower drag than a circular profile. Care can be required in some examples with respect to the center of tension and mass so as to avoid flutter (oscillations). The bridles 112 in various embodiments can also use semi rigid materials such as composites. Use of partially rigid composite bridles 112 and tethers 170 with a minimum bending radius can also help reduce the risk and severity of marine animal entanglement in some examples. Other methods can be used on round bridles 112 to reduce strumming (oscillations that increase drag).

In various embodiments, cyclic control of the rotor 110, active or passive, can enable the use of single point moorings by positioning the rotor 110 away from the mooring line and preventing interference. This method can be applied to other mooring structure variants to prevent rotor mooring line entanglement.

At larger scales especially, rotor transport, deployment, and installation can present practical challenges in some examples. A rotor folding system can be employed in various embodiments to ease logistics and installation. For example, rotor blades 118 or rotor assembly 112 can fold back around a hub 114 such that they are mostly parallel with one another. Being extended out and locked in place once at location. Methods for attaching and detaching blades 118 and/or rotor assemblies 112 at sea can also be employed in some examples.

In one preferred embodiment, a primary bridle 124 on the blades 118 can set the angle of attack when under load while the blades 118 are hinged significantly forward of the center of pressure via arms connected to the hub 114 for feathering when in sinking mode. A separate line to the hub 114, which can be used to raise and lower the upweller rotor 110, thus can act in various embodiments to feather the blades 118, depowering them when under load. This can ensure that during deployment, the rotor 110 raises and lowers in a safe depowered state. This hub line can be used in some embodiments to depower the rotor 110 in an emergency situation. For example, by releasing the main bridle 112, even only a short distance, or similarly tightening the hub tether, the rotor 110 can depower. A small amount of tension on the hub rotor can also be used to move the effective primary bridle position forward, reducing the angle of attack of the blades 118 when in power mode. A passive spring-loaded system, for example, can be integrated into this so as to automatically depower and load limit the upweller system 100.

In some but not all cases, the preferred method of load limiting the upweller system 100 is to use submergence of the wave buoy float 140. Hydrofoil lift can nominally increase with the square of speed. Once the waves get large enough, the vertical speed, and hence hydrofoil speed, can reach a point where lift is matched by wave buoy float buoyancy. When this happens, the wave buoy float 140 can start submerging below the wave peaks. This can serve as a very direct and robust method of load limiting, also limiting the vertical range of motion of the upweller system 100 and submerging the wave buoy 140 below the worst of the waves. Accordingly, in some examples, a wave buoy 140 and associated instrumentation, control systems, computing systems, energy systems, and so forth, can be designed to tolerate some degree of submergence.

The wave buoy 140 in various embodiments can be designed so as to maximize wave energy extraction, especially in low wave conditions in some examples, while still maintaining survivability. The upweller rotor tether 170 in some examples can be attached to near the center of the surface wave buoy 140 or center of gravity of the buoy 140, which can maximize flotation engagement with the water in a manner that can maintain the desired stability and performance when submerged in large waves. Connection at other than near the center of the wave buoy 140 can be used in some embodiments to amplify the vertical range of motion of the upweller rotor stroke, at some loss in force—akin to a lever. For example, the range of vertical motion of the lift buoy 140 while going over a wave can be greater at the bow or stern than at the center. This can act as a gearing system and better enable the use of small waves in steep pycnoclines and/or greater depths. Various mechanical systems can be used to replicate and increase this effect if desired.

In addition, in various embodiments, a direct vertically tethered buoy 140 can nominally only extract wave energy in one axis, the vertical. Two attached, but free to separately pitch, buoys 140 can be mechanically linked to the tether 170 in some embodiments in such a way as to also extract wave energy via differential pitching. Wave power from horizontal cyclic loading of mooring lines, or horizontal motion of the wave buoy 140, can also be utilized to amplify the vertical motion of the tether and rotor 110 in some examples. In some examples, this can significantly increase wave energy extraction, range of motion, and the kinetic energy and/or flow rate of the upweller system 100.

The maximum sinking speed of the hydrofoil rotor 110 in some examples can be primarily set by the drag of the rotor 110 and the weight of the rotor 110. The rotational momentum and kinetic energy of the rotor 110 and thrusters 120 can be used to increase vertical descent speed in various embodiments. As wave height increases, and also as wave period decreases, the vertical descent speed needed can increase, until such a point as a depower system is utilized, for example, submergence. The weight and drag of the rotor 110 can be designed in accordance with desired operation wave range. Additional weight can be added in some examples below the rotor hub 114 so as to optimize the weight of the rotor 114 and corresponding sink rate. In various embodiments, it can be desirable to avoid the tether 170 ever becoming slack, as this can result in high shock loads.

Multiple blade hinge mechanisms can be used to enable the blades to pivot, including various types of bearings and flexures, which operate underwater in various examples. A simple hinge mechanism in front of the blade 118 and/or blade assemblies 112 can be used in some embodiments. Flexural systems can be used in further embodiments, including a flexural hinge. Bridling the leading edge of the blades 118 and/or blade assemblies 112 up and down back to the hub 114 is one example method of doing this with reduced load and high flexure longevity. A torsional flexural joint or member be used in some examples to carry blade compressive loads onto the hub 114.

The rotor blades 118 and/blade assemblies 112 can be constructed so as to be strong in bending yet torsionally flexible. For example, by using an open "C" type wing spar structural section. This can allow the blade 118 to twist and better accommodate the flapping motion. Primary chordwise bridles 122 are one example method of still controlling the angle of attack or pitch of the hydrofoil section. It is possible to make the entire rotor blade 118 in one piece including flexures that allow for the flapping motion.

A single upweller rotor 110 can be deployed in various embodiments at depths of up to 10× its diameter, although it can go deeper in further embodiments (e.g., 11×, 12×, 13×, 14×, 15×, 20×, 50×, and the like) or shallower in some embodiments (e.g., 9×, 8×, 7×, 6×, 5×, 4×, 3×, 2×, 1.5×, and the like). This can be limited in some examples by the length of coherent jet flow that the rotor 110 can maintain and how close to the surface the upwelling might reach, all within the context of the pycnocline. This can directly affect the unit scaling of the upweller rotor 110 in various embodiments. Generally speaking, in some embodiments, the deeper the rotor 110 operates the larger the rotor 110 wants to be, although staging can also be used. With constant disc loading, the structural mass of a rotor 110 can scale in some examples with near the cube of diameter, however with greater depth the disc loading will also generally increase. Hence, larger rotors 110 can be proportionately heavier and more expensive in some examples, although this can be countered by more fixed unit cost scaling, like instrumentation, installation cost, operations and maintenance, and so forth. Most of the continental shelf is less than ~120 meters deep and traveling beyond the continental shelf often entails traveling substantial distances at high costs. While larger deeper ocean upweller systems can be implemented in some examples, various systems can operate on the continental shelf and be scaled accordingly. Wave size can present an immediate scaling constraint in some examples, especially in the case of protected waters including lakes where waves might be much smaller.

An upweller system 100 can be constructed from a multitude of suitable materials noting that marine environment compatibility can be desirable in various examples. For example, the rotor blades 118 and/or blade assembly can be constructed from wood, composites, plastics, and metals, including aluminum, steel, and stainless steel, and combinations thereof. Tethers 170 and bridles 122 can be constructed from polymer lines, including ultra-high molecular weight polyethylene, wire ropes, and composites such as pultruded fiberglass or carbon fiber composites. The wave buoy 140 can be constructed from steel, aluminum, composites, and polymers. In some examples, it can be inflatable or of rigid construction, and can be designed to be able to sustain some degree of submersion, which may or may not prompt a foam core. Solar arrays may be integrated into the surface of the wave buoy 140, and in a manner that allows for some degree of submergence, likewise instrumentation systems.

Upweller instrumentations systems used for science research, in some examples, can be of a higher level of complexity and resolution than that used for general performance monitoring. Simple performance monitoring instrumentation systems that can be utilized for an upweller system in some embodiments can include one or more inertial measurement units (IMUs) and a global positioning system (GPS) for position, rotation, wave motion, and so forth. Depth sensors can be used in some examples for rotor vertical motion and load cells for measuring rotor loads. On top of this, in various embodiments, oceanic monitoring systems can be employed, up and down the tether 170, including temperature and salinity sensors for measuring the thermocline and pycnocline and direct ocean monitoring sensors for concentration of various elements and chemicals, ocean clarity, biological content, and so forth. In various embodiments, weather sensors can be used above the water surface, above and below camera systems for monitoring systems and the surrounding environment, and hydrophones can be deployed beneath the water (e.g., to monitor for possible marine animals). Datalogging and communications systems, including wireless communications systems, can be used in some examples to transfer this data back off the upweller system. This data can then be used in a number of ways, including system monitoring with respect to performance, operations and maintenance, emergency shutdown responses, oceanic environment monitoring, and the like.

Various preferred embodiments can be designed to be robust and largely passive in operation so as to be able to survive many years in a marine environment, sometimes under extreme conditions. On top of this, more active control systems can be integrated in some examples that enable more elaborate operation, preferably with benign failure modes.

The upweller system 100 can, in various embodiments, also be configured to down well or pump water downwards. In some variants, this can be achieved by adding weight or downward mooring tension to the upweller rotor 110 so as to resist upward thrust and inverting the direction of net lift from the rotor blades 118.

Possible applications of the upweller system 100 include but are not limited to: aquaculture including seaweed, mollusk, and fish farming, environmental remediation including seaweed, mollusk, fish and coral recovery and boosting, surface water cooling for environmental remediation, hurricane reduction, ice melt prevention, ecosystem stabilization (temperature control), and general climate control, including air temperature, atmospheric humidity, ocean and wind currents, and wave and coastal erosion mitigation.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, elements that are specifically shown in example embodiments should be construed to cover embodiments that comprise, consist essentially of, or consist of such elements, or such elements can be explicitly absent from further embodiments. Accordingly, the recitation of an element being present in one example should be construed to support some embodiments where such an element is explicitly absent.

What is claimed is:

1. An upweller array disposed in a body of water and anchored to a seabed, the upweller array comprising:
   a plurality of upweller systems that each include:
      a buoy configured to float on the surface of the body of water,
      a tether coupled to and extending downward from the buoy into the body of water, the tether comprising a cable configured to bend or flex, and
      a hydrofoil rotor disposed in the body of water at a depth of between 30 to 150 meters based on a length of the tether and coupled to a terminal end of the tether, the hydrofoil rotor comprising:
         a central hub, and
         a plurality of blade assemblies extending radially from the central hub to define a diameter in a range of 5 to 30 meters, each of the plurality of blade assemblies including a member that extends from the central hub that is connected to a blade, the plurality of blade assemblies configured to pitch up and down relative to an axis defined by the tether with one configuration having the plurality of blade assemblies disposed within a common plane that is perpendicular to the axis defined by the tether with other configurations having the plurality of blade assemblies at a non-perpendicular angle relative to the axis defined by the tether, the plurality of blade assemblies configured to rotate about the axis defined by the tether such that the hydrofoil rotor acts as a free flow propeller that pumps water up towards the surface of the body of water that the hydrofoil rotor is disposed in, the plurality of blade assemblies configured to rotate about a member axis defined by a respective member of a respective blade assembly, and a plurality of bridle assemblies extending from the tether to one of the plurality of blade assemblies, with each of the plurality of blade assemblies comprising two or more bridal assemblies coupled thereto;

a plurality of array lines extending between and coupling the plurality of upweller systems together into a rectangular grid configuration; and a plurality of mooring systems respectively coupled to one or more of the plurality of upweller systems, the plurality of mooring systems anchored to the seabed and configured to hold the plurality of upweller systems at a location in the body of water in the rectangular grid configuration via the plurality of array lines.

2. The upweller array of claim 1, wherein the hydrofoil rotor has three blade assemblies extending radially from the central hub, with the hydrofoil rotor having no more than three blade assemblies, wherein the three blade assemblies are disposed at 120 degrees from each other.

3. The upweller array of claim 1, further comprising a plurality of thrusters, with a respective thruster disposed at a respective terminal end of each of the plurality of blade assemblies.

4. The upweller array of claim 3, wherein the buoy comprises a power source configured to power:
the plurality of thrusters;
a computing system disposed at the buoy; and
one or more sensors disposed at hydrofoil rotor configured to provide data to the computing system disposed at the buoy.

5. An upweller array disposed in a body of water, the upweller array comprising:
a plurality of upweller systems that each include:
a buoy configured to float on the surface of the body of water,
a tether coupled to and extending downward from the buoy into the body of water, the tether comprising a cable configured to bend or flex, and
a hydrofoil rotor disposed in the body of water based on a length of the tether and coupled to an end of the tether, the hydrofoil rotor comprising:
a central hub, and
a plurality of blade assemblies extending radially from the central hub, each of the plurality of blade assemblies including a member that extends from the central hub that is connected to a blade, the plurality of blade assemblies configured to pitch up and down relative to an axis defined by the tether with one configuration having the plurality of blade assemblies disposed within a common plane that is perpendicular to the axis defined by the tether with other configurations having the plurality of blade assemblies at a non-perpendicular angle relative to the axis defined by the tether, the plurality of blade assemblies configured to rotate about the axis defined by the tether such that the hydrofoil rotor acts as a free flow propeller that pumps water up towards the surface of the body of water that the hydrofoil rotor is disposed in, the plurality of blade assemblies configured to pivot around a hinge axis predominantly aligned with a blade span axis of a respective blade assembly.

6. The upweller array of claim 5, wherein the tether is configured to be winched up and down for deployment and retrieval of the hydrofoil rotor.

7. The upweller array of claim 5, wherein the hydrofoil rotors of the plurality of upweller systems are disposed at a depth of between 30 to 150 meters in the body of water.

8. The upweller array of claim 5, wherein the plurality of blade assemblies extending radially from the central hub define a diameter in a range of 5 to 30 meters.

9. The upweller array of claim 5, wherein the plurality of upweller systems further comprise a plurality of bridle assemblies extending from the tether to one of the plurality of blade assemblies, with each of the plurality of blade assemblies comprising one or more bridal assemblies coupled thereto.

10. The upweller array of claim 5, further comprising a plurality of array lines extending between and coupling the plurality of upweller systems together into a grid configuration.

11. The upweller array of claim 5, further comprising one or more mooring systems respectively coupled to one or more of the plurality of upweller systems, the plurality of mooring systems anchored to a bottom of the body of water and configured to hold the plurality of upweller systems at a location in the body of water.

12. An upweller array configured to be disposed in a body of water, the upweller array comprising:
one or more upweller systems that include:
a buoy configured to float on the surface of the body of water,
a tether coupled to the buoy, and
a hydrofoil rotor coupled to the tether, the hydrofoil rotor configured to be disposed in the body of water based on a length of the tether.

13. The upweller array of claim 12, wherein the tether is configured to extend downward from the buoy into the body of water with the tether comprising a cable configured to bend or flex.

14. The upweller array of claim 12, wherein the hydrofoil rotor comprises:
a central hub, and
a plurality of blade assemblies extending from the central hub.

15. The upweller array of claim 14, wherein each of the plurality of blade assemblies include a member that extends from the central hub that is connected to a blade.

16. The upweller array of claim 14, wherein the plurality of blade assemblies are configured to pitch up and down relative to an axis defined by the tether.

17. The upweller array of claim 14, wherein the hydrofoil rotor is configured to assume:
a first configuration with the plurality of blade assemblies disposed within a common plane that is perpendicular to the axis defined by the tether and other configurations having the plurality of blade assemblies at a non-perpendicular angle relative to the axis defined by the tether.

18. The upweller array of claim 14, wherein the plurality of blade assemblies are configured to rotate about the axis defined by the tether.

19. The upweller array of claim 14, wherein the plurality of blade assemblies are configured to rotate about a respective central axis defined by a respective length of the plurality of blade assemblies.

20. The upweller array of claim 12, wherein the hydrofoil rotor is configured to pump water up towards the surface of the body of water that the hydrofoil rotor is disposed in.

* * * * *